United States Patent
Wening et al.

(10) Patent No.: US 9,511,619 B2
(45) Date of Patent: Dec. 6, 2016

(54) METHOD AND DEVICE FOR HOT STAMPING

(75) Inventors: Jochen Wening, Oberasbach (DE);
Peter Muhlfelder, Oberasbach (DE);
Klaus Pforte, Oberasbach (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 32 days.

(21) Appl. No.: 14/119,578

(22) PCT Filed: May 4, 2012

(86) PCT No.: PCT/EP2012/058272
§ 371 (c)(1),
(2), (4) Date: Feb. 14, 2014

(87) PCT Pub. No.: WO2012/159871
PCT Pub. Date: Nov. 29, 2012

(65) Prior Publication Data
US 2014/0174306 A1    Jun. 26, 2014

(30) Foreign Application Priority Data

May 24, 2011  (DE) ........................ 10 2011 103 000

(51) Int. Cl.
*B41F 19/00* (2006.01)
*B44B 5/00* (2006.01)
(Continued)

(52) U.S. Cl.
CPC ............. *B44B 5/0047* (2013.01); *B32B 37/02* (2013.01); *B32B 37/203* (2013.01);
(Continued)

(58) Field of Classification Search
CPC ... B41F 16/00; B41F 16/0006; B41F 16/0013; B41F 19/02; B44B 5/00; B44B 5/0009
See application file for complete search history.

(56) References Cited

U.S. PATENT DOCUMENTS 3,648,604 A * 3/1972 Warsager ........................ 101/181
4,802,949 A * 2/1989 Mitsam .......................... 156/540
(Continued)

FOREIGN PATENT DOCUMENTS

CA          2745913       7/2010
DE          3210551       10/1983
(Continued)

*Primary Examiner* — David Banh
(74) *Attorney, Agent, or Firm* — Hoffmann & Baron, LLP

(57) ABSTRACT

The invention relates to a method for hot stamping at least part of at least one band-shaped stamping foil (10, 20) onto a band-shaped substrate (30), as well as a corresponding hot stamping device. The substrate (30) to be stamped is brought together with one stamping foil (10, 20) of the at least one stamping foils (10, 20). The substrate (30) and the stamping foil (10, 20) resting thereon are guided along the periphery of a first heated stamping roller wherein, in a first stamping, a first stamping layer is stamped onto the substrate (30). The once-stamped substrate (30) is guided away from the first stamping roller and again brought together with the same or a further stamping foil (10, 20) of the at least one stamping foils (10, 20) after the first stamping roller in the direction of travel (33) of the substrate (30). The once-stamped substrate (30) and the stamping foil (10, 20) resting thereon are guided along the periphery of a second heated stamping roller wherein, in a second stamping, a second stamping layer is stamped onto the substrate (30). Finally the twice-stamped substrate (30) is guided away from the second stamping roller.

18 Claims, 7 Drawing Sheets

(51) Int. Cl.
| | |
|---|---|
| *B32B 37/02* | (2006.01) |
| *B32B 37/20* | (2006.01) |
| *B44C 1/17* | (2006.01) |
| *D21H 25/00* | (2006.01) |
| *D21H 21/40* | (2006.01) |
| *B42D 25/425* | (2014.01) |
| *B42D 25/43* | (2014.01) |
| *B42D 25/305* | (2014.01) |
| *B42D 25/351* | (2014.01) |
| *B42D 25/333* | (2014.01) |
| *B42D 25/382* | (2014.01) |
| *B42D 25/346* | (2014.01) |
| *B42D 25/387* | (2014.01) |
| *B42D 25/378* | (2014.01) |
| *B32B 37/00* | (2006.01) |
| *B32B 37/12* | (2006.01) |
| *B32B 38/00* | (2006.01) |
| *B32B 38/04* | (2006.01) |
| *B42D 25/45* | (2014.01) |

(52) U.S. Cl.
CPC ......... *B42D 25/305* (2014.10); *B42D 25/333* (2014.10); *B42D 25/346* (2014.10); *B42D 25/351* (2014.10); *B42D 25/378* (2014.10); *B42D 25/382* (2014.10); *B42D 25/387* (2014.10); *B42D 25/425* (2014.10); *B42D 25/43* (2014.10); *B44C 1/1729* (2013.01); *D21H 21/40* (2013.01); *D21H 25/005* (2013.01); *B32B 37/0053* (2013.01); *B32B 37/025* (2013.01); *B32B 37/1207* (2013.01); *B32B 38/145* (2013.01); *B32B 2038/042* (2013.01); *B32B 2305/342* (2013.01); *B32B 2309/14* (2013.01); *B32B 2309/72* (2013.01); *B32B 2317/12* (2013.01); *B32B 2429/00* (2013.01); *B32B 2457/202* (2013.01); *B42D 25/45* (2014.10); *B42D 2033/46* (2013.01)

(56) References Cited

U.S. PATENT DOCUMENTS

| | | | |
|---|---|---|---|
| 5,207,855 A * | 5/1993 | Nyfeler et al. | 156/351 |
| 5,962,832 A | 10/1999 | Dorner | |
| 6,129,015 A * | 10/2000 | Dewey | 101/211 |
| 6,202,549 B1 | 3/2001 | Mitsam et al. | |
| 6,317,149 B1 * | 11/2001 | Mochida et al. | 347/173 |
| 6,476,841 B1 | 11/2002 | Miyano | |
| 6,651,891 B1 * | 11/2003 | Zakel et al. | 235/487 |
| 7,900,678 B2 | 3/2011 | Mitsam et al. | |
| 2001/0047582 A1 * | 12/2001 | Gallagher | 29/740 |
| 2004/0108055 A1 * | 6/2004 | Franko, Sr. | 156/267 |
| 2009/0115185 A1 * | 5/2009 | Hoffmuller et al. | 283/85 |
| 2010/0247218 A1 * | 9/2010 | Sakamoto | B41J 11/46 400/583 |

FOREIGN PATENT DOCUMENTS

| | | |
|---|---|---|
| DE | 19514999 | 10/1996 |
| DE | 102007058815 | 4/2009 |
| EP | 089494 | 9/1983 |
| EP | 0350235 | 1/1990 |
| EP | 0433575 | 6/1991 |
| EP | 0673317 | 9/1996 |
| GB | 2259888 | 3/1993 |
| JP | 2003094704 | 4/2003 |
| WO | WO99/24934 | 5/1999 |
| WO | WO2005/104026 | 11/2005 |
| WO | WO2005/120832 | 12/2005 |
| WO | WO2010/072339 | 7/2010 |

* cited by examiner

METHOD AND DEVICE FOR HOT STAMPING

This application claims priority based on an International Application filed under the Patent Cooperation Treaty, PCT/EP2012/058272, filed on May 4, 2012, and German Application No. DE 102011103000.3, filed on May 24, 2011.

BACKGROUND OF THE INVENTION

The invention relates to a method and a device for hot stamping.

EP 0 089 494 A2 describes a method for stamping flexible webs by means of band-shaped hot stamping foils. In order to increase the operating speed, the web with the hot stamping foil is guided over a larger distance along a heated surface of a support body and the web and hot stamping foil are together pressed against the heated surface of the support body by several pressure rollers arranged at a distance from one another along the heated surface. This makes it possible to achieve at least a five-fold increase in the operating speed. A device for carrying out the method is characterized by the arrangement of a roller cage which is formed in such a way that the rollers can gradually be applied to a stamping roller progressively from the inside to the outside. The stamping roller is driven according to the invention via a coupling with varying torque, for example a magnetic particle coupling or via an electronic torque control, in particular by means of an electric shaft.

SUMMARY OF THE INVENTION

The object of the invention is to provide an improved method for hot stamping and a corresponding device.

The object is achieved by a method for hot stamping at least part of at least one band-shaped stamping foil onto a band-shaped substrate, wherein the substrate to be stamped is brought together with one stamping foil of the at least one stamping foils, the substrate and the stamping foil resting thereon are guided along the periphery of a first heated stamping roller wherein, in a first stamping, the substrate and the stamping foil resting thereon are pressed against one another and against the heated surface of the first stamping roller by at least one first pressure roller arranged at the periphery of the first stamping roller and a first stamping layer is stamped onto the substrate, the once-stamped substrate is guided away from the first stamping roller and is again brought together with the same or a further stamping foil of the at least one stamping foils after the first stamping roller in relation to the [in the] direction of travel of the substrate, the once-stamped substrate and the stamping foil resting thereon are guided along the periphery of a second heated stamping roller wherein, in a second stamping, the substrate and the stamping foil resting thereon are pressed against one another and against the heated surface of the second stamping roller by at least one second pressure roller arranged at the periphery of the second stamping roller and a second stamping layer is stamped onto the substrate, and the twice-stamped substrate is guided away from the second stamping roller. The object is further achieved by a hot stamping device, comprising a substrate feeder, through which a band-shaped substrate to be stamped can be fed; at least one band guide, through which at least one band-shaped stamping foil can be brought together with the fed substrate; a first stamping station with a first heated stamping roller and at least one first pressure roller, arranged at the periphery of the first stamping roller, through which the substrate and one stamping foil resting thereon of the at least one stamping foils can be guided along the periphery of the first stamping roller and thus at least part of the stamping foil resting on the substrate can be stamped onto the substrate in the form of a first stamping layer; a second stamping station arranged after the first stamping station in relation to the direction of travel of the substrate with a second heated stamping roller and at least one second pressure roller, arranged at the periphery of the second stamping roller, through which the once-stamped substrate and one stamping foil resting thereon of the at least one stamping foils can be guided along the periphery of the second stamping roller and thus at least part of the stamping foil resting on the substrate can be stamped onto the substrate in the form of a second stamping layer; and a substrate delivery unit, through which the twice-stamped substrate can be removed from the device.

The method and the device are suitable for hot stamping security elements onto a substrate web, in particular a paper web for producing banknotes, in a high-speed process, e.g. at a speed in the range of from 1 m/min up to 500 m/min, in particular 80 m/min up to 200 m/min.

The invention is based on a roller design, i.e. a production method from roller to roller: a substrate web is unwound from a feed roller, guided through the device in a single pass, in order to be stamped with stamping layers by means of at least one stamping foil, in a first stamping that is carried out in the first stamping station, and in a second stamping that is carried out in the second stamping station, and finally wound onto a storage roller. Apart from the stampings the substrate can also be provided with further applications in the device or subjected to further treatments, such as printing with printing layers, provision of window openings, irradiation, moistening.

The at least one stamping foil can comprise two different stamping foils wherein, in the first stamping, a first stamping foil of the two different stamping foils is at least partly stamped onto the substrate, whereby a first stamping layer is formed on the substrate, and in the second stamping a second stamping foil of the two different stamping foils is at least partly stamped onto the substrate, whereby a second stamping layer is formed on the substrate.

Alternatively it is possible that the at least one stamping foil comprises only one single stamping foil wherein, in the first stamping, the stamping foil is partly stamped onto the substrate, whereby a first stamping layer is formed on the substrate, and in the second stamping, the remainder of the stamping foil left behind after the first stamping is at least partly stamped onto the substrate, whereby a second stamping layer is formed on the substrate.

At least one of the at least one stamping foils can be formed as a transfer foil that has a carrier foil and a transfer layer that can be detached therefrom preferably by means of heat and transferred onto the substrate. In this case, after the stamping only the transfer layer remains on the substrate in the form of a stamping layer, whereas the carrier foil is separated from the transfer layer. If a stamping foil formed as transfer foil is used for the first and/or second stamping, only part of the stamping foil is stamped onto the substrate, namely the transfer layer, in the respective stamping.

At least one of the at least one stamping foils can be formed as a laminating foil with a top layer, which has a carrier foil and a top layer, for example a decorative layer, as well as an adhesive layer, in particular heat-activatable, which are arranged together in the form of a stamping layer on the substrate. At least one of the at least one stamping foils can be formed as a laminating foil without a top layer, which is arranged on the substrate in the form of a stamping layer. If a stamping foil formed as laminating foil is used for the first and/or second stamping, the entire stamping foil is stamped onto the substrate in the respective stamping.

A polymer foil can serve as carrier foil, e.g. made of polyester, polyethylene terephthalate (=PET), polyethylene naphthalate (=PEN), polyethylene (=PE), polypropylene (=PP) or polycarbonate (=PC), preferably with a thickness of 6 µm to 125 µm.

On its side facing the substrate the stamping foil preferably has a heat-activatable adhesive layer, by means of which at least part of the stamping foil, i.e. the stamping layer, or the entire stamping foil is fixed to the substrate. It is moreover possible that on its side facing away from the substrate the stamping layer or the stamping foil has a print-receiving layer, which improves the properties of the stamping layer or the stamping foil as regards overprintability, i.e. adhesion of printer inks to the stamping layer or the stamping foil.

It is possible that, in the stamping procedure, the transfer layer of a stamping foil formed as transfer foil is stamped onto the substrate over the whole surface, in the form of a strip preferably extending over the whole panel, as is the case e.g. with the foil strips of the 5, 10 and 20 euro banknotes of the first series of euro banknotes. It is also possible that, in the stamping procedure, the transfer layer of a stamping foil formed as transfer foil is stamped onto the substrate partially, in the form of a locally limited foil element, e.g. with a round, oval or square outline, as is the case e.g. with the foil element of the 50, 100, 200 and 500 euro banknotes of the first series of euro banknotes.

It is also possible that the stamping foil is a transfer foil with hot-stampable labels, as described e.g. in WO 2010/072 339 A2. Such a transfer foil comprises a base foil that has a first carrier foil and a single- or multi-layered decal layer which can be separated from the first carrier foil. A second carrier foil is applied to the surface of the first carrier foil facing away from the decal layer by means of a first adhesive layer, such that the first adhesive layer is arranged between the first carrier foil and the second carrier foil. The first adhesive layer is activated in a first area at least partially covering at least one first partial area of the base foil and, however, not activated, not provided, only partially provided, or deactivated in a second area adjacent to this area. The first carrier foil is then at least partially separated along the boundary line defining the at least one first partial area and separating the at least one first partial area from a second partial area of the base foil. A second part of the base foil comprising the second partial area is pulled off the second carrier foil, whereas, in the at least one first partial area, the base foil adheres to the second carrier foil due to the activated first adhesive layer, and a first part of the base foil comprising the at least one first partial area remains on the second carrier foil. The decal layer of the first part of the base foil remaining on the second carrier foil thus forms transferable labels with their own carrier foil, i.e. the first carrier foil, which is held on an auxiliary carrier foil, i.e. the second carrier foil and, from there, stamped onto a substrate or detached in a stamping procedure. In the case of a circular outline these transferable labels are referred to as "pills". With such a stamping foil it is possible to provide a security element which, by means of a conventional transfer procedure, can be transferred onto a security document, for example a banknote or an ID document, and which avoids the occurrence of "fraying" due to uncontrolled tearing of the decal layer in the edge area of the transferred multi-layered body (ID=Identification). The "pills" can in particular serve to close a window opening in a substrate.

The foil can have on its upper side a print-receiving layer which improves the properties of the foil as regards overprintability, i.e. the adhesion of printer inks.

Any material in the form of web can serve as substrate, which material withstands the stresses, in particular mechanical, arising during stamping in the roller-to-roller method. In practice fiber substrates or polymer foil substrates primarily come into consideration for this. Single-layered or multi-layered fiber substrates such as paper or cotton substrates, laminates or extrudates made of a combination of natural fibrous material (e.g. paper, cotton) and plastic, e.g. a composite of several layers of paper or fibers and plastic, as well as single-layered or multi-layered plastic substrates are particularly suitable as banknote substrate. A known paper-plastic combination is the banknote paper Durasafe® from Landqart AG, Switzerland. Cotton-plastic combinations for banknotes are supplied e.g. by Giesecke & Devrient GmbH, Germany. A known plastic substrate is the banknote substrate Guardian® from Securency International Pty Ltd., Australia, and Innovia Films, United Kingdom.

The substrate web is divided into a plurality of identical segments, also called panels, which are arranged on the substrate web in nips along the direction of travel of the substrate and rows transversely to the direction of travel of the substrate. A panel can e.g. be in the form of a banknote, a sheet of business paper or an identity page. The division of the substrate web into panels is a standard procedure in printing technology, in order to make optimal use of the available substrate web to form a large number of identical printed products. Depending on its width, e.g. one to two meters, the substrate web has a specific number of adjacent panel nips, e.g. three to eight nips. A specific number of stamping paths can be allocated to each panel nip, i.e. a specific number of stamping layers are to be applied to each panel.

In the case of conventional stamping machines the minimum distance between two stamping paths lies in the region of approx. 100 mm for structural reasons. This is due to the dimensions of the stamping foil pulling units transversely to the direction of travel of the substrate, i.e. the width of the band guides, rollers and other components which guide the stamping foils during stamping and in particular exert a traction force on the stamping foil in order to keep the stamping foil taut and/or to be able to adjust the longitudinal position of the stamping foil to a small extent by means of the traction force. The foil pulling units have a specific minimum width, determined by the mechanism or by the motor, etc., which limits the minimum distance between two stamping paths and does not allow adjacent stamping layers to be stamped onto the substrate web at a substantially smaller distance. Even in the case of an arrangement of adjacent foil pulling units offset in the direction of travel of the substrate, it is not possible to substantially reduce the minimum distance between two stamping paths.

With conventional stamping machines based on the sheet or roller design, and having only one single stamping station, if it is desired to carry out a number of stamping operations on the substrate, i.e. a sheet or a substrate web, which exceeds the maximum number of stamping paths possible in one pass, as described above, after a first stamping procedure the substrate has to be guided through the same machine again in a second stamping pass. Due to these two passes the final processing speed, i.e. the output rate of end products, i.e. stamped substrate, is reduced by at least 50%.

A disadvantage of these several passes, apart from the greatly reduced processing speed and the modification operations that may be required on the single machine, is the necessary interim storage of the substrate which, in the case of the production of banknotes, is as a rule present in the form of paper or made of other natural fiber substrates among those named above. Paper or also other natural fiber substrates "live", i.e. change with environmental conditions such as atmospheric humidity and temperature. During the interim storage between the two passes the paper thus arrives in a state that cannot be controlled more closely, which is different from that before the first stamping. The second stamping cannot thereby be carried out under the same conditions as the first stamping. The machine may have to be adjusted to the different paper properties, which is time consuming. However, at the same time as the different properties, the paper has different dimensions because, depending on environmental conditions, the paper warps minimally, in particular non-linearly in all spatial directions. This also means that there may be a reduction in accuracy such as positional accuracy or register between the first and second stamping or between the second stamping and the paper.

In contrast to conventional stamping machines which are based on the sheet or roller design and have only one single stamping station, the above-mentioned disadvantages do not occur with the present invention.

Due to the uninterrupted multiple stamping in two stamping stations arranged consecutively, i.e. "inline production", with the present invention it is possible to achieve a significant increase in the process speed, i.e. a significant increase in the output rate of end products, i.e. finished stamped substrate, compared with the conventional dual-pass system.

Due to the rapid time sequence, in the seconds range, of the two stamping steps, during the second stamping almost the same stamping conditions prevail as during the first stamping or there is very accurate knowledge of the current properties of the paper, because the environmental conditions vary only insignificantly between the first and the second stamping. Based on the knowledge of the properties of the paper before the first stamping and the only slight change in the paper since the first stamping, e.g. due to humidity, the second stamping can be accurately adjusted to the known conditions. With the present invention a possibly time-consuming adjustment of the stamping conditions to greatly changed and largely unknown paper properties is thus dispensed with. At the same time there is an increase in accuracy between first and second stamping.

According to the invention the substrate web and the stamping foil resting thereon are guided over a larger distance along the heated surface of the stamping roller, and the substrate web and stamping foil together are pressed against each other and against the heated surface of the stamping roller by several pressure rollers arranged at a distance from one another along the heated surface. Thus several "nips" are provided consecutively, through which the substrate web with the stamping foil runs, wherein in these nips the stamping foil is in each case pressed, by a pressure roller, against the substrate web to be decorated. The advantage of such a design of the stamping station, as described e.g. in EP 0 089 494 A2 and WO 2005/120 832 A1, is that the substrate web with the stamping foil remains constantly heated on the way between the individual nips and therefore no cooling takes place in the intermediate space between the different pressure rollers. In this way it is possible to achieve a significant operating speed of more than 150 m/min. As no cooling of the substrate web and the stamping foil takes place between the individual pressure rollers, there is also no risk of distortions of the decal image occurring. With this arrangement not only is a significant operating speed achieved, but also at the same time a high stamping quality.

Advantageous embodiments of the invention are described in the dependent claims.

It is particularly preferred if, during the first and/or second stamping, the substrate and the stamping foil resting on the substrate are pressed against one another and against the heated surface of the first stamping roller by at least two pressure rollers arranged around the stamping roller at a distance from one another. A significant increase in operating speed is thereby possible, because the surface area, on which pressure and heat to the stamping foil guided along the periphery of the stamping roller and resting on the substrate is increased. Due to the increased surface area the time in which pressure and heat act on the stamping foil is also extended, and in particular the adhesive layer and optionally a detachment layer of the stamping foil can thereby be sufficiently activated, in order in particular to achieve a particularly good adhesion of the stamping foil on the substrate and/or a particularly good detachment of the transfer layer of a stamping foil formed as transfer foil.

In this context, it is a preferred development of the device according to the invention, if the first stamping station comprises at least two first pressure rollers, arranged around the first stamping roller [comprises] at a distance from one another, through which the substrate and the stamping foil resting thereon of the at least one stamping foils, can be guided along the periphery of the first stamping roller and thus at least part of the stamping foil resting on the substrate can be stamped onto the substrate in the form of the first stamping layer and/or if the second stamping station comprises at least two second pressure rollers, arranged around the second stamping roller [comprises] at a distance from one another, through which the once-stamped substrate and the stamping foil resting thereon of the at least one stamping foils can be guided along the periphery of the second stamping roller and thus at least part of the stamping foil resting on the substrate can be stamped onto the substrate in the form of the second stamping layer.

According to a preferred development of the invention the substrate is printed with at least one printing layer before the first stamping and/or between the first and second stamping and/or after the second stamping. A printing layer can be arranged between the substrate and the first stamping layer and/or between the first and second stamping layer and/or on the second stamping layer. It is preferred that the hot stamping device for this purpose comprises at least printing mechanism arranged before the first stamping station and/or between the first and second stamping station in relation to the direction of travel of the substrate and/or after the second stamping station in relation to the direction of travel of the substrate, for applying a printing layer to the substrate. Printing mechanisms for printing ink or functional layers in offset printing, silk-screen printing, gravure printing or inkjet printing can be arranged at any position and preferably independently of the stamping stations within the hot stamping device, i.e. between an optional winding and unwinding unit, in order to print the substrate and/or a stamped stamping layer between the stamping procedures.

According to a preferred development of the invention the at least one printing layer is arranged in an area to be stamped and/or in a stamped area of the once- and/or twice-stamped substrate. With the several stamping stations according to the invention it is now possible that the first stamping layer is not only underprinted on the substrate, i.e. a printing layer is applied to the substrate before the first stamping, but also overprinted, i.e. a printing layer is applied to the first stamping layer after the first stamping, and the printing layer applied to the first stamping layer is then again over-stamped, e.g. in order to seal the printing layer. It is also possible to overprint the second stamping layer again. Any sandwich structures of printing layers and stamping layers are thereby possible, e.g. the layer structure printing layer/ stamping layer/printing layer/stamping layer/printing layer, wherein their register-accurate interaction preferably produces novel optical and/or functional effects.

A decal or a security printing, visible or invisible (IR-/UV-fluorescent) can be applied as printing layer, e.g. an Iriodin® strip in order to produce a pearlescent effect dependent on the viewing angle. Functional layers can also be applied as printing layer, i.e. primer layers, adhesive layers, adhesion promoter layers, print-receiving layers, dirt repellent layers, impregnation layers, protective varnish layers, replication varnish layers, effect pigment layers, etc.

According to a preferred development of the invention the substrate is turned in a turning station between the first and second stamping. It is preferred that the hot stamping device for this purpose comprises a turning station arranged between the first and second stamping station, for turning the substrate. The turning station can be formed as a turn-over bar. In the case of an activated turning station, despite the stamping rollers turning in the same direction, the first and second stamping can take place on opposite sides of the substrate. A first stamping takes place on a first side of the substrate and a second stamping on a second side of the substrate opposite the first side. If the turning station is deactivated or bypassed, the second stamping is carried out on the same side as the first stamping.

It is also possible that the first and the second stamping layer are stamped onto opposite sides of the substrate, without a turning station being used. In this case the first and the second stamping rollers rotate in opposite directions.

According to a preferred development of the invention at least one window opening is formed in the substrate before the first stamping and/or between the first and second stamping and/or after the second stamping. It is preferred that the hot stamping device for this purpose comprises a unit for forming the at least one window opening in the substrate arranged before the first stamping station and/or between the first and second stamping station in relation to the direction of travel of the substrate and/or after the second stamping station in relation to the direction of travel of the substrate. It has proved advantageous if the unit for producing the at least one window opening is formed by a punching unit, in particular a rotating punching cylinder, a laser cutting unit or a water jet cutting unit. The distances between individual window openings formed in the substrate are for example provided using a punching cylinder and continuously repeated around the periphery of the punching cylinder. The position of the punching cylinder and its speed of rotation can be controlled. It is however just as possible for a non-rotating punching tool to be used. It is just as possible that the window openings are already introduced into the substrate during the production of the substrate, in particular during the paper production by a corresponding design of the paper screen. Window openings of this kind usually have characteristic frayed edges, depending on the nature of the substrate material. Such window openings can be completely or partially over-punched by means of the punching unit.

According to a preferred development of the invention, before the first stamping and/or between the first and second stamping, a register mark is printed on, and/or a control opening is formed in, the substrate and a positioning of the first stamping layer and/or second stamping layer along the direction of travel of the substrate, i.e. in the longitudinal register, is controlled using the register mark or the control opening. The register mark can also be a watermark present in the substrate which was produced during production of the substrate. The register mark can also be formed from a combination of printed register mark and/or watermark and/or control opening. The introduction of the window opening described above can also take place in a controlled manner using the register mark or the control opening. It is preferred that the hot stamping device and/or the punching unit for this purpose comprises at least one sensor for detecting a feature arranged on or in the substrate, functioning as a register mark. The sensor can be formed as a camera system or a register mark reading device for optical detection of the register mark, the signals from which are sent to a regulating device.

A register mark is a marking placed on the substrate which, in a subsequent substrate method step or treatment step such as printing, stamping or formation of a window opening serves for controlling the position of an application corresponding to the method or treatment step such as printing layer, stamping layer or window opening on the substrate. A register mark can be formed as a printed register cross. A control opening is a window opening formed in the substrate which serves as register mark. A control opening can be formed as a register hole. Due to such register marks or control openings it is possible to maintain a predetermined positional accuracy of applications such as printing layer, stamping layer or window opening on the substrate, in relation to an outer edge of a web or panel. This is referred to as the register accuracy of the applications arranged on the substrate. The term register also covers a positional accuracy of applications on the front and back of a substrate web in relation to one another. In the case of double-sided printing, reference is also made to the turning register. In the case of multi-color printing the term register, in particular color register, also refers to the position of the color separations in relation to one another. In the machine direction or direction of travel of the substrate, reference is made to the circumferential or longitudinal register, and transversely thereto, the transverse or lateral register.

The lateral register, i.e. registering in transverse direction, of the applications on the substrate, e.g. printing and stamping layers arranged thereon and openings introduced therein, is always provided and present as a rule. For this, the position of the application such as a stamping path is controlled relative to the paper and set in such a way that the stamping path runs precisely at a defined distance from an edge of a panel. The stamping path also always runs at the same transverse position on the substrate. This can be ensured by a path-edge control of the hot stamping device which, by means of stop rails, guarantees that the substrate passes into the next station in precise alignment.

As regards the longitudinal register, i.e. the positional accuracy between two different applications on the substrate in longitudinal direction, there are various possibilities. It is possible that an application such as a stamping path is arranged on the substrate in longitudinal direction either non-registered, i.e. continuously without reference to optionally present longitudinal register marks, or is arranged on the substrate registered relative to longitudinal register marks.

It is possible that the first stamping takes place non-registered in longitudinal direction, whilst the second stamping takes place registered. In this case a punched control window outside the useful area can serve as register mark, said window preferably being formed at the same time as a window opening punched within the useful area. The register mark can however also be a watermark present in a paper substrate or a marking printed on the substrate, which is e.g. applied by means of inkjet printing.

It is also possible that a register mark is already placed on and/or in the substrate before the first stamping, e.g. in the same printing step with which a security print is applied to the substrate, and the first stamping and the second stamping take place with register accuracy using this register mark.

Should an actual position of a stamping layer or another application such as a printing layer or a window opening to be applied to the substrate deviate from a nominal position, the position must be corrected relative to the substrate. It is preferred that the hot stamping device for this purpose has a positioning unit for alignment and/or correction of a position of the substrate and/or of the at least one stamping foil. For example the positioning unit shifts a stamping foil a predetermined distance relative to the substrate web. It is also possible that the positioning unit controls the position of the stamping foil along the direction of travel of the substrate by means of different traction forces and resultant elongation of the stamping foil.

According to a preferred development of the invention a positioning of the second stamping layer along the direction of travel of the substrate, i.e. in the longitudinal register, is controlled using a design feature and/or a register mark that is present in the first stamping layer.

In this case, in the second stamping the reference point used is not a register mark placed directly on or in the substrate, preferably printed on or punched in, but a preferably optically detectable design feature and/or a register mark that was applied to the substrate with the first stamping layer. This design feature and/or register mark in the first stamping layer serves as register mark for the second stamping. In this way the positional accuracy between first and second stamping layer can be improved. It is possible that a stamping layer functions only as a registering layer which has register marks, but no design. This stamping layer is stamped onto the substrate as a stamping path running along the edge of the substrate or between useful areas of the substrate, and provides register marks for all the stamping paths to be stamped parallel in the second stamping. It is also possible that the positioning of the stamping layer stamped on in the second stamping is controlled using coordinates resulting from a combination of a register mark placed directly on or in the substrate and a register mark which was applied to the substrate in the with the first stamping layer. It is possible that coordinates of register marks are detected on the substrate and on the first stamping layer, the detected coordinates are interpolated and the second stamping is controlled using the interpolated value.

According to a preferred development of the invention the first stamping layer forms at least one first stamping path on the substrate, whilst the second stamping layer forms at least one second stamping path on the substrate, which is arranged offset transversely to the direction of travel of the substrate relative to the at least one first stamping path. Due to the spatial distance between the first and second stamping station in the direction of travel of the substrate it is possible to remove the limitations existing in the case of conventional stamping machines with respect to the minimum distance between adjacent stamping paths. In a single pass of the substrate adjacent stamping paths can be stamped onto the substrate as close to one another as desired and, because of the rapid time sequence of the stampings, with a high degree of relative positional accuracy.

The first stamping layer is stamped onto the substrate in the first stamping station, the second stamping layer is stamped onto the substrate in the second stamping station, wherein any desired offset of the second stamping layer relative to the first stamping layer can be adjusted transversely to the direction of travel of the substrate.

For example it is possible that a specific number of stamping paths is stamped on one side of the substrate in the first stamping, e.g. three to eight paths, and the same number of stamping paths is again stamped onto the same side of the substrate in the second stamping, but offset in relation to the first paths within the minimum distance. In this way it is possible either to apply more paths to a panel such as a banknote than conventionally, or also to stamp panels with smaller dimensions, such as smaller banknotes, with one path in each case, which is not possible because of the limitations with respect to the minimum distance existing in the case of conventional stamping machines. On the substrate web twice as many paths as previously are thus possible in a single pass, and the paths lie closer to each other than allowed by the actual machine limitation in the case of conventional stamping machines with a single stamping station. The second paths can directly adjoin the first paths in the longitudinal direction of the substrate and/or at least partly overlap with the first paths. In particular, it is possible to thereby achieve a closely adjacent and/or overlapping position of several security elements or foil elements on the substrate, if the transfer layer of a stamping foil formed as transfer foil is stamped onto the substrate in the stamping procedure partially in the form of a locally limited foil element, e.g. with round, oval or square outline.

According to a preferred development of the invention the first and/or second stamping layer and/or a further layer which has been arranged, in particular printed, on the substrate in a manner other than by stamping have radiation-curable components which, after being stamped on or applied to the substrate, are cured by high-energy radiation. It is preferred that the hot stamping device for this purpose comprises a radiation unit for radiation of the substrate. UV-radiation or particle radiation, e.g. electron radiation, is preferably used as radiation. It is possible that the first and/or second stamping takes place with stamping layers which contain UV-curable varnishes, but which have not yet been finally cured. Furthermore it is possible that in the case of printing printer inks are used which contain UV-curable varnishes, but which have not yet been finally cured. Post-curing or final curing does not take place until after the stamping. It is thus possible, for example, to provide overlapping printing/foil and/or foil/foil on the substrate and to cure these overlapping layer structures after their application to the substrate.

It is thereby possible that an improved chemical and/or physical and/or mechanical joining of layers of a layer structure arranged on the substrate is achieved after their application one below the other onto the substrate. Components of the layers reacting with one another are also conceivable. Furthermore, it is possible that in the non-cured/fixed state the layers react with one another to form another state which is then fixed by radiation. Such a method can only take place in a rapid inline process in which an interim storage between two stampings, as is unavoidable with conventional stamping machines that have only one single stamping station, would be a hindrance.

It is also possible that the stamping foils to be stamped are protected against damage with liners, i.e. covering layers that are pulled off before the stamping. The stamping foils can have e.g. liquid, waxy, powdery or flaky components (flakes) or small individual elements such as chips (ICs=integrated circuits) that are encapsulated between stamping or printing layers. A preferred example of this is a display, e.g. an LC display or a PDLC display, preferably made of a liquid or waxy liquid crystal material (LC=Liquid Crystal; PDLC=Polymer Dispersed Liquid Crystal), or a liquid, waxy or powdery e-ink display.

According to a preferred development of the invention, after the first stamping at least one functional element is arranged on the first stamping layer, which element is encapsulated between the first and second stamping layer by the second stamping. It is also possible that individual elements are placed on the substrate after a first stamping and then encapsulated between two stamping layers in a second stamping. It is preferred that the hot stamping device for placing individual elements on the substrate comprises a placement device.

It is advantageous if the first stamping layer on a first side of the substrate is formed spanning over a window opening penetrating through the substrate, the at least one functional element is arranged in the window opening from a second side of the substrate opposite the first side, and the second stamping layer on the second side of the substrate is formed spanning over the window opening. By placing a functional element such as an IC chip in a window opening or a similar recess in the substrate—the element thus lies in a depression—a "building up" of thickness is avoided or reduced.

According to a preferred development of the invention the twice-stamped substrate web is moistened after the first stamping station and/or the second stamping station in relation to the direction of travel of the substrate. It is preferred that the hot stamping device for this purpose comprises a moistening station. Such a re-moistening after a stamping procedure is in particular advantageous in the case of a hot stamping onto a paper substrate, as this makes it possible to return to the paper the moisture removed therefrom by pressure and heat during stamping. A defined residual moisture in a paper substrate is indispensable for a specific elasticity of the substrate.

BRIEF DESCRIPTION OF THE DRAWINGS

The invention is explained below with reference to several embodiment examples with the aid of the attached drawing. There are shown in.

DETAILED DESCRIPTION OF THE INVENTION

Figure 1A:
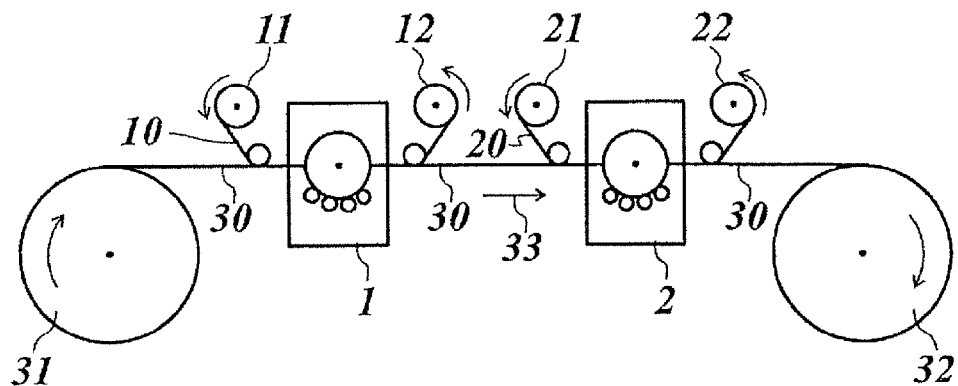
FIG. 1a-1c three different embodiment examples of a hot stamping device in a schematic representation, FIG. 2 a schematic representation of a hot stamping device, in which a substrate web passes through a succession of various stations, FIG. 3 a schematic section of a stamping roller with pressure rollers.

FIG. 1a shows a hot stamping device in which the first and second stamping stations are each operated with a different transfer foil. The hot stamping device comprises a feed roller 31, from which a substrate web 30 is unwound, a first stamping station 1 and a second stamping station 2 through which the substrate 30 passes in that order, and a storage roller 32, onto which the twice-stamped substrate web 30 is wound. Before the substrate web 30 passes into the first stamping station 1, it is brought together with a first stamping foil 10, formed as transfer foil, which is unwound from a first feed reel 11. In the schematic drawing only one single first feed reel 11 is represented for simplicity's sake; however, in practice several first feed reels are as a rule arranged parallel, corresponding to the number of the first stamping foils to be stamped onto the substrate web 30.

The substrate web 30 with the transfer foil 10 resting thereon is guided around a heated stamping roller of the first stamping station 1 and pressed against one another and against the heated surface of the stamping roller by pressure rollers with an adjustable pressure. The stamping roller and the pressure rollers are shown only schematically in FIG. 1a to 1c. A more detailed description of the stamping roller and the pressure rollers is to be found in the description of the figures with reference to FIG. 3.

An adhesive layer, which is arranged on the side of the transfer foil 10 facing towards the substrate 30, and a detachment layer of the transfer foil 10 are activated by the pressure and the heat acting on the substrate web 30 with the transfer foil 10 resting thereon, in the first stamping station 1. The adhesive layer thereby joins a transfer layer of the transfer foil 10 to the substrate web 30, and a carrier foil of the transfer foil 10 can be detached from the transfer layer after the substrate web 30 has passed through the first stamping station 1. This detachment takes place in that the carrier foil is guided by a deflecting roller away from the substrate web 30 and towards a first take-up reel 12, onto which it is wound. In the schematic drawing only one single first take-up reel 12 is represented for simplicity's sake; however, in practice several first take-up reels are as a rule arranged parallel, corresponding to the number of the first stamping foils to be stamped onto the substrate web 30. The transfer layer of the transfer foil 10 remains on the substrate web 30 as first stamping layer.

Before it passes into the second stamping station 2, the thus once-stamped substrate web 30 is brought together with a second stamping foil 20 formed as transfer foil which is unwound from a second feed reel 21. The explanations given above with respect to the first stamping procedure at the first stamping station 1 also apply correspondingly to the second stamping procedure at the second stamping station 2. The substrate web 30 twice-stamped after leaving the second stamping station 2 is finally wound onto the storage roller 32.

Figure 1B:
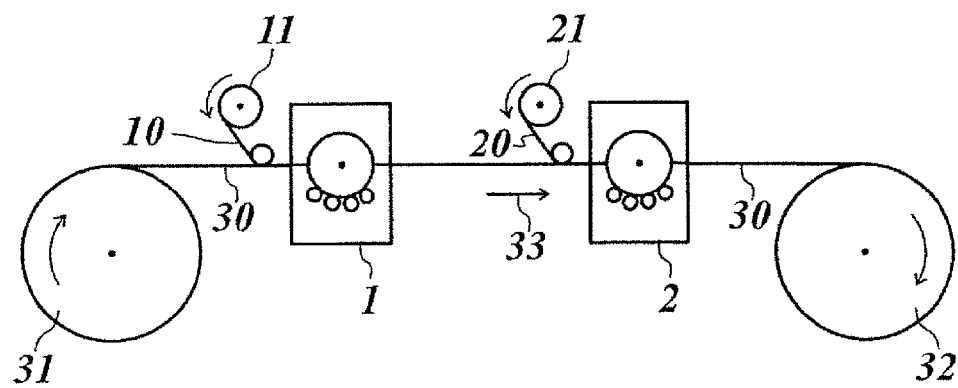

FIG. 1b shows a hot stamping device in which the first and second stamping stations are each operated with a different laminating foil. The hot stamping device comprises a feed roller 31 from which a substrate web 30 is unwound, a first stamping station 1 and a second stamping station 2 through which the substrate 30 passes in that order, and a storage roller 32 onto which the twice-stamped substrate web 30 is wound. Before the substrate web 30 passes into the first stamping station 1, it is brought together with a first stamping foil 10, formed as laminating foil, which is unwound from a first feed reel 11. In the schematic drawing only one single first feed reel 11 is represented for simplicity's sake; however, in practice several first feed reels are as a rule arranged parallel, corresponding to the number of the first stamping foils to be stamped onto the substrate web 30.

The substrate web 30 with the laminating foil 10 resting thereon is guided around a heated stamping roller of the first stamping station 1 and pressed against one another and against the heated surface of the stamping roller by pressure rollers with an adjustable pressure. An adhesive layer which is arranged on the side of the laminating foil 10 facing towards the substrate 30, is activated by the pressure and the heat acting on the substrate web 30 with the laminating foil 10 resting thereon in the first stamping station 1. The adhesive layer thereby joins the laminating foil 10 to the substrate web 30. The laminating foil 10 remains on the substrate web 30 as first stamping layer.

After the first stamping station 1 further work steps, not represented in more detail here, can be carried out, or treatment stations can be passed through, for example in a punching unit the punching of a window opening into the substrate web 30 and into the laminating foil 10 fixed thereon. The substrate web 30 can then pass through a turning station and be turned there, with the result that the second stamping procedure takes place in the second stamping station 2 on the other side of the substrate web 30 to the first stamping procedure and in particular covers and/or recloses the window opening.

Before it passes into the second stamping station 2, the thus once-stamped substrate web 30 is brought together with a second stamping foil 20, formed as laminating foil, which is unwound from a second feed reel 21. The explanations given above with respect to the first stamping procedure at the first stamping station 1 also apply correspondingly to the second stamping procedure at the second stamping station 2. If the second stamping procedure takes place on the side of the substrate web 30 opposite the first laminating foil 10, it can be advantageous, in particular for closing a window opening in the substrate web 30 and in the laminating foil 10, if the laminating foil 20, viewed perpendicularly to the substrate web 30, is arranged largely congruent with the laminating foil 10 or largely covers the same surface areas of the substrate web 30. The substrate web 30 twice-stamped after leaving the second stamping station 2 is finally wound onto a storage roller 32.

Figure 1C:
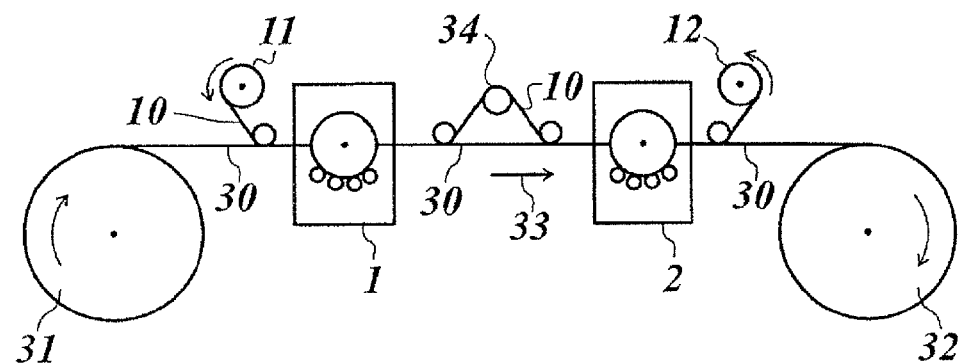

FIG. 1*c* shows a hot stamping device, in which the first and second stamping stations are operated with the same transfer foil. The hot stamping device comprises a feed roller 31, from which a substrate web 30 is unwound, a first stamping station 1 and a second stamping station 2, through which the substrate 30 passes in that order, and a storage roller 32, onto which the twice-stamped substrate web 30 is wound. Before the substrate web 30 passes into the first stamping station 1, it is brought together with a first stamping foil 10, formed as transfer foil, which is unwound from a first feed reel 11. In the schematic drawing only one single first feed reel 11 is represented for simplicity's sake; however, in practice several first feed reels are as a rule arranged parallel, corresponding to the number of the first stamping foils to be stamped onto the substrate web 30.

The substrate web 30 with the transfer foil 10 resting thereon is guided around a heated stamping roller of the first stamping station 1 and pressed against one another and against the heated surface of the stamping roller by pressure rollers with an adjustable pressure. The surface of the stamping roller is formed e.g. with protrusions and depressions, and in such a way that only partial areas of the transfer foil 10 rest against the stamping roller. An adhesive layer, which is arranged on the side of the transfer foil 10 facing towards the substrate 30, and a detachment layer of the transfer foil 10 are activated in areas by the pressure and the heat acting on the partial areas, resting against the stamping roller, of the substrate web 30 with the transfer foil 10 resting thereon in the first stamping station 1. The activated areas of the adhesive layer thereby partially join a transfer layer of the transfer foil 10 to the substrate web 30, and the transfer foil 10 can be detached from the partial areas of the transfer layer stuck to the substrate 30, after the substrate web 30 has passed through the first stamping station 1. This detachment takes place in that the transfer foil 10 with the not yet transferred areas of the transfer layer is guided by a deflecting roller away from the substrate web 30 and to a guide roller 34 which is situated at an adjustable distance from the plane of the substrate web 30. From there the transfer foil 10 is fed back into the plane of the substrate web 30 again, so that it is once again lying on the once-stamped substrate web 30, when it passes into the second stamping station 2.

A defined shift of the transfer foil 10 relative to the longitudinal direction of the substrate web 30 is achieved by the adjustable distance of the guide roller 34 from the substrate web 30. The position of the not yet transferred areas of the transfer layer of the transfer foil 10 can thus be adjusted relative to the substrate web 30. During the stamping procedure in the second stamping station 2 at least partial areas of the not yet transferred areas of the transfer layer of the transfer foil 10 are then transferred to predetermined locations on the substrate web 30. The substrate web 30 twice-stamped after leaving the second stamping station 2 is finally wound onto the storage roller 32. A turning station can be provided between the first stamping station 1 and the second stamping station 2, with the result that the stamping at the second stamping station 2 is carried out on the side of the substrate 30 opposite the first stamping, resulting in a substrate stamped on both sides using a single transfer foil.

It is also possible for the detachment of the transfer foil 10 not to be carried out after the first stamping station 1, but only after the second stamping station 2. This is advantageous in particular when in the first stamping station 1 a transfer of the transfer layer of the transfer foil 10 takes place over the whole surface, i.e. the adhesive layer of the transfer foil 10 is activated over the whole surface by the acting pressure and heat. In the second stamping station 2 the entire surface of the transfer foil 10 is then again exposed to pressure and heat, whereby a further partial or complete activation of the adhesive layer of the transfer foil 10 takes place and an improvement in the adhesion of the transfer layer of the transfer foil 10 to the substrate 30 can be achieved. This is advantageous in particular when a very high operating speed is to be selected during stamping. In spite of a very high operating speed, the double activation of the adhesive layer of the transfer foil 10 can make it possible to achieve a sufficient adhesion of the transfer layer of the transfer foil 10 to the substrate 30, wherein, at the same operating speed with only one stamping station, the adhesion would not be sufficient.

Figure 2:
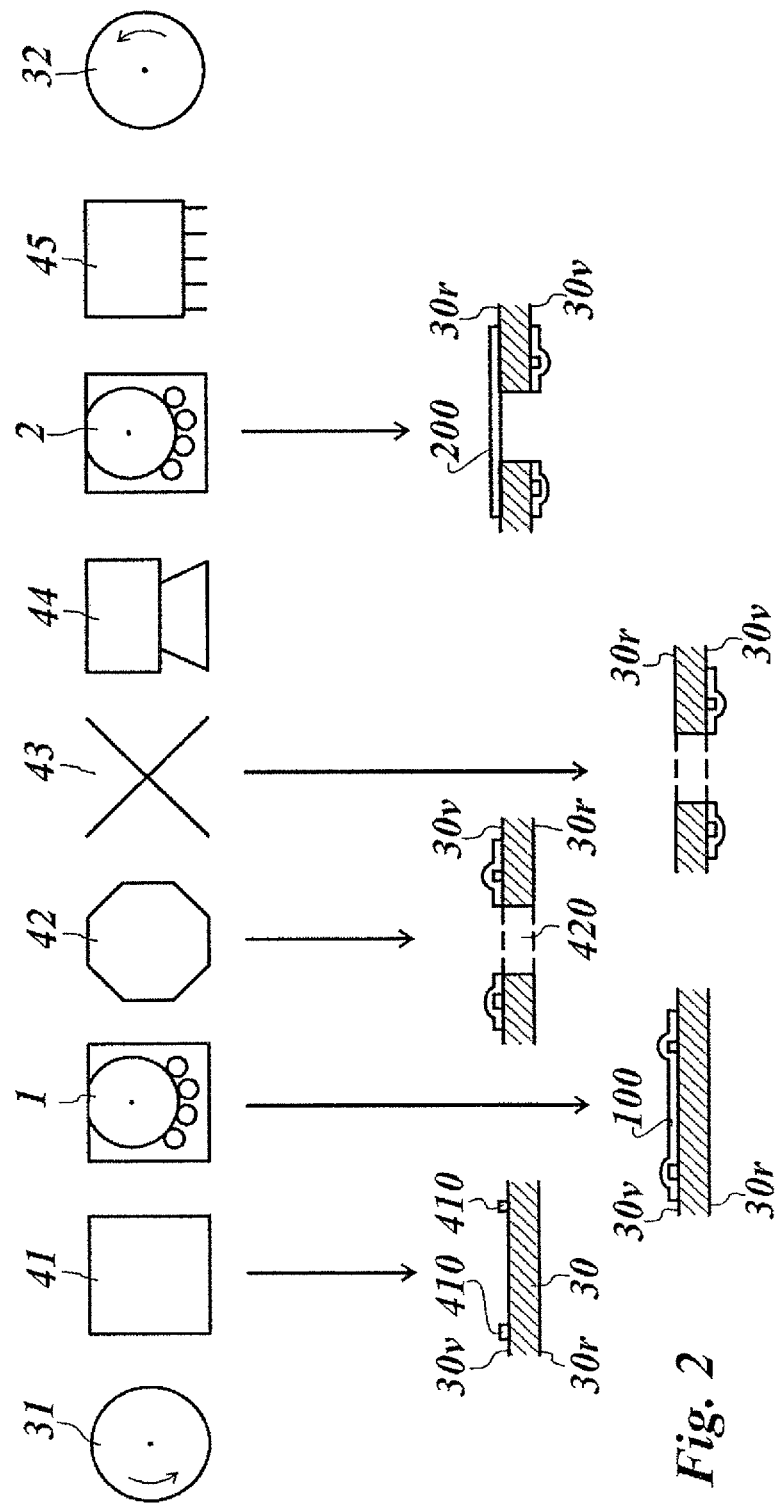

FIG. 2 shows in a schematic representation an example of a sequence of various stations of a hot stamping device that are passed through in order from left to right by a substrate web 30 and, underneath, sections through the substrate web 30 with the corresponding applications. Firstly the substrate web 30 is unwound from a feed roller 31. The substrate web 30 then passes through a printing mechanism 41, in which a printing layer 410 is printed onto the substrate 30, e.g. a guilloche pattern in steel gravure printing.

The substrate web then passes through a first stamping station 1 in which a first stamping layer 100 is applied to a first side 30v of the substrate. A stamp 42 then produces a window opening 420 in the once-stamped substrate, which window opening completely penetrates through both the substrate web and the first stamping layer 100.

In the subsequent step the substrate web is turned in a turning station 43. Subsequently an optical sensor 44 detects the precise position of the window opening 420 and sends the position coordinates to a regulating device by which a subsequent stamping in a second stamping station 2 is controlled. A second stamping layer 200 is applied to the second side 30r of the substrate opposite the first side 30v precisely over the window opening 420, so that the window opening 420 is closed by the second stamping layer 200. In a subsequent step the substrate web is re-moistened in a moistening station 45. The twice-stamped substrate web 30 is then wound onto a storage roller 32.

It is possible that the hot stamping device also comprises a positioning unit, preferably in the form of an adjustable guide roller which serves for the alignment and correction of a position of a second stamping foil relative to the substrate web. For example, this positioning unit is positioned between the sensor 44 and the second stamping station 2.

It is also possible that the hot stamping device additionally comprises a radiation unit, preferably a UV lamp or an electron source, which serves for radiation of the substrate, in order to cure a curable material, e.g. a varnish coating, arranged on the substrate. For example, this radiation unit is positioned after the printing mechanism 41 or after the first stamping station 1 in relation to the direction of travel of the substrate 30, where it cures a curable printing layer 410 and a curable stamping layer 100 stamped over it, by means of radiation.

Furthermore, it is possible that the hot stamping device comprises a placement unit which serves for placing at least one functional element on the substrate. For example, placement unit is positioned before a stamping station 1, 2, in order to deposit on the substrate an LC element or an IC element which is subsequently over-stamped with a foil layer 100, 200 in the stamping station 1, 2.

Figure 3:
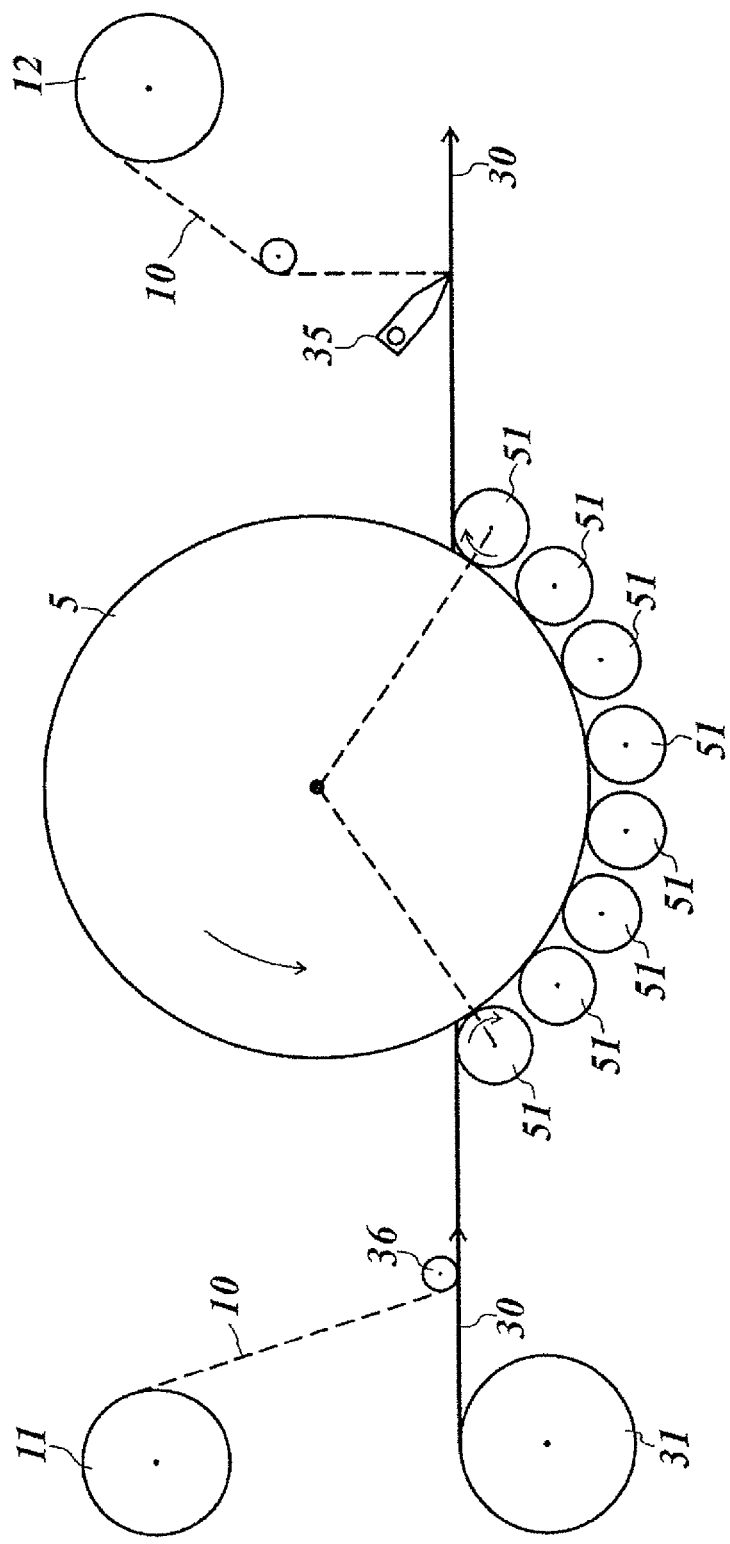

FIG. 3 shows a schematic section of a stamping roller 5 of a first stamping station with eight pressure rollers 51 resting against the stamping roller 5. A flexible substrate web 30 is here drawn off a feed roller 11, with a transfer foil 10 drawn off a feed reel 11, which is made up of a carrier foil and the transfer layer, guided together over deflecting rollers 36 and conveyed through a gap between the stamping roller 5 and the pressure rollers 51. The pressure rollers 51 are pressed against the transfer foil 10, the substrate web 30 and the stamping roller 5, so that the pressure required for transferring the transfer layer of the transfer foil 10 onto the substrate web 30 is produced. The pressure rollers 51 can in particular be actuated in pairs in such a way that a specific number of pressure rollers 51, e.g. two, four, six or eight pressure rollers, can be pressed against the stamping roller 5 and can thereby be optimally adjusted depending on the type of application and speed of application of the stamping pressure. The pressure rollers 51 are arranged in such a way that approximately one-third of the stamping roller 5 is encircled by substrate web 30 and transfer foil 10 and a so-called roller cage is formed, which surrounds the lower part of the stamping roller 5. The substrate web 30 with the stamping foil resting thereon is thus also guided around the lower part of the stamping roller 5. The advantage of this web guidance over a web guidance around the upper part of the stamping roller 5 is that excess heat which is released during the stamping procedure is thereby removed more efficiently by convection.

After leaving the supporting roller 5 the substrate web 30 provided in areas or over the whole surface with the transfer layer is separated from the carrier foil 10 and optionally non-transferred areas of the transfer layer by means of a peel edge 35. The carrier foil 10 is wound onto a take-up reel 12. The once-stamped substrate web 30 is guided in the direction of a second stamping station which operates analogously to the first stamping station.

The pressing force of the pressure rollers 51 against the stamping roller influences the adhesion of a transfer layer or a laminating foil to the substrate web. The pressing force can be regulated by means of disc springs, positioning cylinders or by a hydraulically or pneumatically controlled sprung bearing of the pressure rollers 51. The pressing force can be regulated upwards or downwards individually per pressure roller pair, in particular in the direction of rotation of the stamping roller in relation to the pressing force of the respective adjacent pressure roller pair.

Further details of the structure and operation of a stamping roller with pressure rollers can be found in the patent documents DE 32 10 551 A1, EP 0 089 494 A2 and WO 2005/120832 A1, to which reference is made here.

Figure 4A:
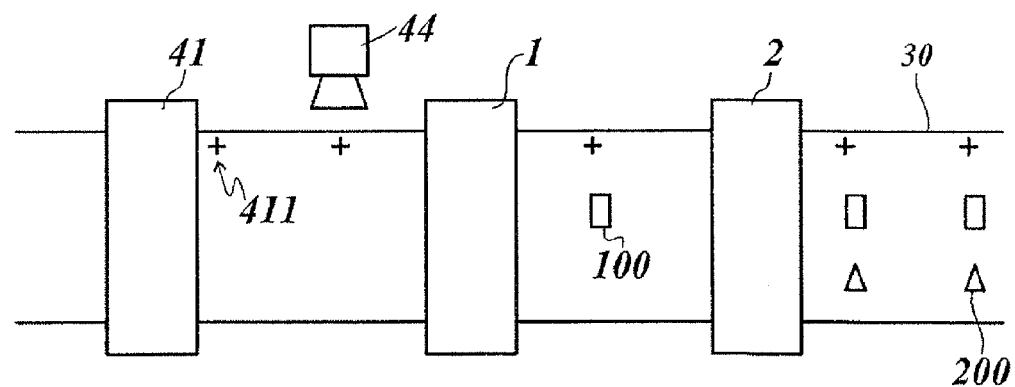
FIG. 4a-b shows a schematic top view of a substrate web that passes through a first and a second stamping station.

FIG. 4a shows a schematic top view of a substrate web 30 that passes, from left to right, through a printing mechanism 41, a first stamping station 1 and a second stamping station 2. In the printing mechanism 41 register marks 411 are printed at predetermined distances along the edge of the substrate web 30, preferably outside the useful area, e.g. one register mark 411 for each row of panels. It is possible that a security print is printed onto the panels of the substrate web 30 at the same time as the register marks 411. However, in the case of a single-color printing mechanism, i.e. if the register mark is printed with the same color as the security print, depending on the type of security print this could result in the register mark not providing sufficient contrast for detection by means of a sensor. In order to avoid such problems, the register marks 411 can be printed with a separate color, preferably contrasting strongly with the substrate, in order to allow better optical detection with sensors.

Printing of the register mark can also be carried out e.g. by means of an inkjet head after the substrate unwinder, i.e. before the printing mechanism 41, in relation to the direction of travel of the substrate. A black high-contrast register mark can be printed in this way. This can then be used for an insetter process (longitudinal register) of the printing mechanism 41. The register mark, as an alternative to a watermark, can then be used for the insetter process (longitudinal register) at stamping station 1 and stamping station 2. At the 2nd stamping station, alternatively to the printed register mark or watermark, a punched mark which was inserted by means of a punch, can also be detected, in order to regulate the longitudinal register for the stamping station 2.

A sensor 44 detects the position coordinates of the printed register mark 411 and sends them to a regulating device by which a subsequent stamping of a first stamping layer 100 in the first stamping station 1 is controlled with register accuracy in relation to the register marks 411. A further stamping of a second stamping layer 200 in the second stamping station 2 with register accuracy in relation to the register marks 411 is also controlled on the basis of the position coordinates of the printed register mark 411. It is also possible that, instead of printed register marks, control openings are used, which are e.g. produced in the substrate by a punching tool.

Figure 4B:
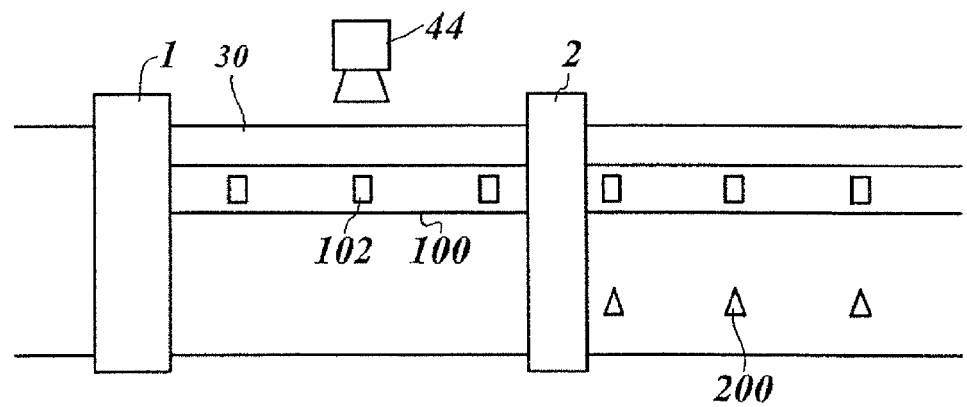

FIG. 4b shows a schematic top view of a substrate web 30 that passes from left to right through a first stamping station 1 and a second stamping station 1. In the first stamping station 1 a first stamping layer 100 is stamped onto the substrate web 30 in the form of a continuous foil strip, wherein the foil strip bears a design feature 102, e.g. a specific geometric pattern, at fixed distances. A sensor 44 detects the position coordinates of the design features 102 and sends them to a regulating device, by which a subsequent stamping of a second stamping layer 200 in the second stamping station 2 is controlled with register accuracy in relation to the design features 102 of the first stamping layer 100.

Figure 5:
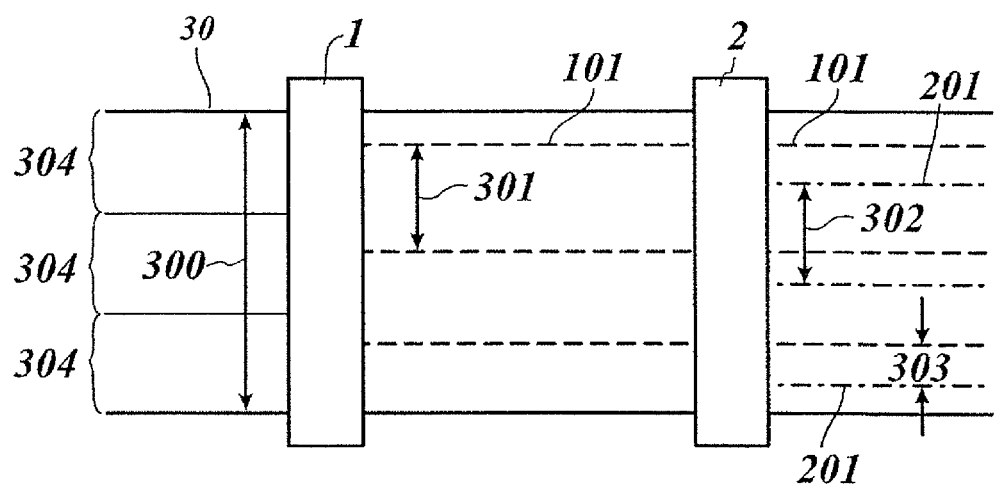
FIG. 5 a schematic top view of a substrate web that passes through a first and a second stamping station, FIG. 6a-c schematic sections of stamped and printed substrate webs after passing through a first and a second stamping station, and FIG. 7a-b schematic sections of stamped substrate webs equipped with an individual element after passing through a first and a second stamping station.

FIG. 5 shows a schematic top view of a substrate web 30 that passes from left to right through a first stamping station 1 and a second stamping station 2. The width 300 of the substrate web 30, which amounts to e.g. 1000 mm, is divided into several panel nips 304. A specific number of stamping paths can be allocated to each panel nip 304, i.e. a specific number of stamping layers are to be applied to each panel. In the first stamping station 1 each panel nip 304 is stamped with a first stamping layer along a first stamping path 101. The distance 301 between two adjacent first stamping paths 101 is limited, for example to approx. 100 mm, for structural reasons. In the second stamping station 2 each panel nip 304 is stamped with a second stamping layer along a second stamping path 201. The distance 302 between two adjacent second stamping paths 201, corresponding to the first stamping paths 101, is also limited, for example also to approx. 100 mm, for structural reasons.

In the second stamping station 2 the second stamping paths 201 can be produced at a distance as small as desired from the first stamping paths 101, as the offset between the first and second stamping paths 101, 201 is not subject to any structurally determined limitation. Because of the passage of the substrate web 30 through two consecutive stamping stations 1, 2 each panel nip, and thus each panel, can be stamped with different stamping layers that are at a distance as small as desired from one another, in one process. Compared with conventional stamping devices with only one single stamping station a significant improvement in efficiency is thus possible.

Figure 6A:
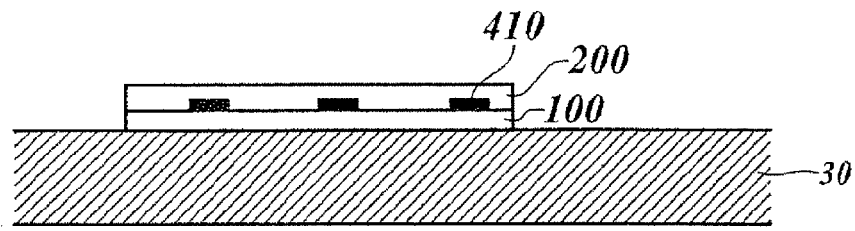

FIG. 6a shows a schematic section of a twice-stamped and once-printed substrate web 30 that has been produced in a hot stamping device as follows: After the unwinding of the substrate web 30 from a feed roller the substrate web 30 is stamped in a first stamping station, with a first stamping layer 100, e.g. in the form of a foil patch detached from a transfer foil. The substrate web 30 is then printed on its once-stamped side with a printing layer 410. This can be carried out by means of one printing procedure in offset printing, silk-screen printing, gravure printing or inkjet printing. The printing layer 410 can be a piece of information, e.g. an indication of value, a portrait or other image, or a pattern that is difficult to reproduce, e.g. guilloches or a fine-lined grid. It is possible that the printing layer 410 is applied exclusively on the stamping layer 100. Alternatively the printing layer 410 can extend over the stamping layer 100 and the unstamped surface of the substrate web 30. In a subsequent step the substrate web 30 is stamped, in a second stamping station, with a second stamping layer 200 that precisely covers the first stamping layer 100, e.g. in the form of a foil patch detached from a transfer foil. The printing layer 410 is thus protected against chemical and physical manipulations by encapsulation between the stamping layers 100, 200.

Figure 6B:
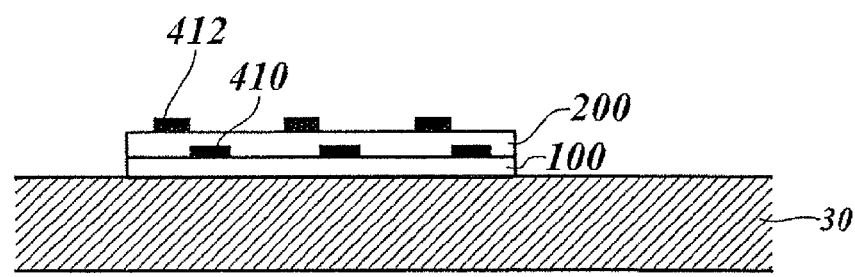

FIG. 6b shows a schematic section of a twice-stamped and twice-printed substrate web 30. The processing steps of the substrate web 30 correspond to those of the substrate web shown in FIG. 6a, with the difference that the second stamping layer 200 is printed in a final step, namely in a further printing mechanism arranged after the second stamping station in relation to the direction of travel of the substrate, with a second printing layer 412, to which the explanations given with respect to FIG. 6a apply correspondingly. Optical and functional effects can be produced by a register-accurate interaction of the first and second printing layers 410, 412.

Figure 6C:
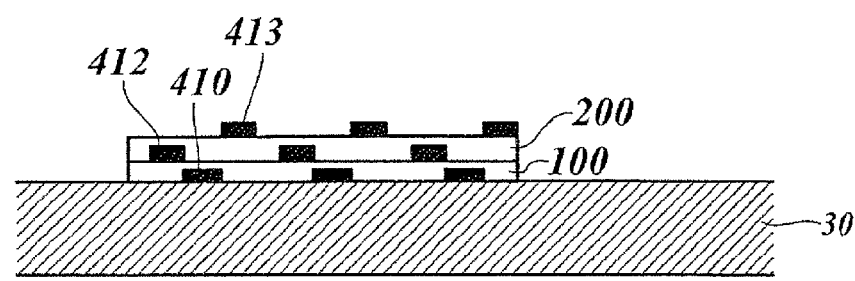

FIG. 6c shows a schematic section of a twice-stamped and three-times-printed substrate web 30 that has been produced in a hot stamping device as follows: After the unwinding of the substrate web 30 from a feed roller the substrate web 30 is printed, in a first printing mechanism, with a first printing layer 410. The first printing layer 410 is then over-stamped, in a first stamping station, with a first stamping layer 100. The first stamping layer 100 is then printed with a second printing layer 412. In a subsequent step the second printing layer 412 is stamped, in a second stamping station, with a second stamping layer 200 that precisely covers the first stamping layer 100. The three printing layers 410, 412, 413 can consist of the same printing material, e.g. the same ink, or of different printing materials. It is possible for example that the first printing layer 410 is a dark ink, with which a piece of information such as a word or a figure is printed on the paper substrate. The second and third printing layers 412, 413 can be different-colored varnishes which display additional effects, e.g. fluorescence. Optical and functional effects can be produced by a register-accurate interaction of the three printing layers 410, 412, 413.

It is also possible that adjacent layers of the layers shown in FIG. 6a-c, e.g. the first printing layer 410 and second stamping layer 200 shown in FIG. 6b, each comprise not yet fully cured materials that react with one another after the adjacent layers have been stamped or printed. Only after their application does a final curing take place in a curing station of the device, e.g. a UV radiation unit. Until they are finally cured, a first substance containing in the first printing layer 410 interacts with a second substance containing in the second stamping layer 200 to reach a reaction state that is fixed by the radiation.

The layer structures shown in FIGS. 6a-6c can also at least partly close or cover a window opening in the substrate web 30.

Figure 7A:
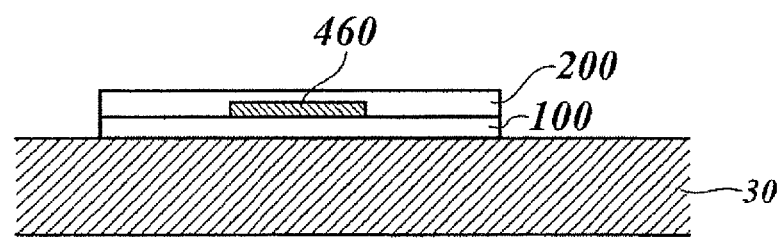

FIG. 7a shows a schematic section of a twice-stamped substrate web 30 that has been produced in a hot stamping device as follows: After the unwinding of the substrate web 30 from a feed roller the substrate web 30 is stamped, in a first stamping station, with a first stamping layer 100. In a placement station of the device, a functional element 460, e.g. an IC chip or an LC display, is then placed in the centre of the first stamping layer 100, preferably fixed by means of an adhesive layer previously applied to the first stamping layer 100 and finally, in a subsequent step, the functional element 460 is stamped, in a second stamping station, with a second stamping layer 200 which precisely covers the first stamping layer 100. The functional element 460 is thus protected against chemical and physical manipulations by encapsulation between the stamping layers 100, 200.

Figure 7B:
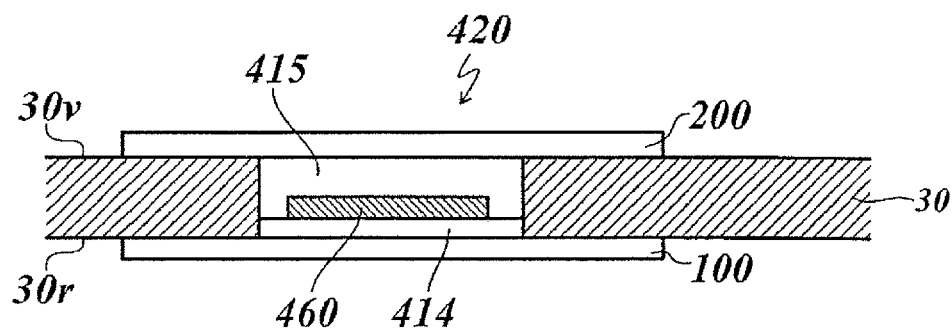

FIG. 7b shows a schematic section of a twice-stamped substrate web 30 that has been produced in a hot stamping device as follows: After the unwinding of the substrate web 30 from a feed roller a window opening 420 is formed in the substrate web 30, in a punching unit. Subsequently, in a first stamping station, the window opening 420 is closed with a first stamping layer 100 that is stamped onto the back 30r of the substrate 30. Subsequently the substrate web 30 passes through a turning station 43 in which it is turned. In a placement station of the device a functional element 460, e.g. an IC chip or an LC display, is then introduced in particular in the centre of the window opening 420 and can in particular be fixed, by means of an optional adhesive layer 414, to the first stamping layer 100. In an optional subsequent step, in a printing mechanism, the remaining space of the window opening 420 can be filled in with a filling material 415, e.g. a transparent plastic varnish. Finally, in a second stamping station, the window opening 420 is closed with a second stamping layer 200 that is stamped onto the front 30v of the substrate 30. The functional element 460 is protected against chemical and physical manipulations by encapsulation between the stamping layers 100, 200. Moreover, an undesired thickening of the finished substrate in the area of the functional element 460 is avoided or reduced by the positioning of the functional element 460 in the window opening 420.

LIST OF REFERENCE NUMBERS 1 first stamping station
2 second stamping station
5 stamping roller
10 first stamping foil
11 first feed reel
12 first take-up reel
20 second stamping foil
21 second feed reel
22 second take-up reel
30 substrate, substrate web
30v front
30r back
31 feed roller
32 storage roller
33 direction of travel of the substrate web
34 guide roller
35 peel edge
36 deflecting roller
41 printing mechanism
42 punch
43 turning station
44 sensor
45 moistening station
51 pressure roller
100 first stamping layer
101 first stamping path
102 design feature
200 second stamping layer
201 second stamping path
300 width of the substrate web
301 distance between adjacent first stamping paths
302 distance between adjacent second stamping paths
303 distance between first and second stamping paths
304 panel nip
410 printing layer (first)
411 register mark
412 second printing layer
413 third printing layer
414 adhesive layer
415 filling material
420 window opening
460 functional element

The invention claimed is:

1. A method for producing a finished stamped substrate end product by hot stamping at least part of at least one band-shaped stamping foil onto a band-shaped substrate, wherein
the substrate passes through a first printing mechanism, in which a first printing layer is printed onto a first surface of the substrate,
the substrate to be stamped is brought together with one stamping foil of the at least one stamping foils,
the substrate and the stamping foil resting thereon are guided along the periphery of a first heated stamping roller, wherein, in a first stamping, the first surface of the substrate and the stamping foil resting thereon are pressed against one another and against the heated surface of the first stamping roller by at least two first pressure rollers arranged around the periphery of the first stamping roller at a distance from one another and a first stamping layer is stamped onto the substrate,
the once-stamped substrate is guided away from the first stamping roller and a window opening is formed through both the first stamping layer and the substrate,
the substrate having the printed first surface and the first stamping layer and window opening is turned in a turning station such that a second surface opposite said first surface is brought together with the same or a further stamping foil of the at least one stamping foils after the first stamping roller in relation to the direction of travel of the substrate,
the turned substrate and the stamping foil resting on the second surface are guided along the periphery of a second heated stamping roller, wherein, in a second stamping, the second surface of the substrate and the stamping foil resting thereon are pressed against one another and against the heated surface of the second stamping roller by at least two second pressure rollers arranged around the periphery of the second stamping roller at a distance from one another and a second stamping layer is stamped onto the substrate over the window opening, and
the twice-stamped substrate is guided away from the second stamping roller to a second printing mechanism in which a second printing layer is printed onto the second surface of the substrate, thereby producing a finished stamped substrate end product, and
wherein, before the first stamping and/or between the first and second stamping, a register mark is printed on, or a control opening is formed in, the substrate and a positioning of the first stamping layer and/or the second stamping layer along the direction of travel of the substrate is controlled using the register mark or the control opening.

2. A method according to claim 1, wherein the substrate is further printed with a third printing layer between the first and second stamping.

3. A method according to claim 2, wherein at least one of the first, second or third printing layer is arranged in an area to be stamped and/or in a stamped area of the once- and/or twice-stamped substrate.

4. A method according to claim 1, wherein a further window opening is formed in the substrate before the first stamping and/or after the second stamping.

5. A method according to claim 1, wherein a positioning of the second stamping layer along the direction of travel of the substrate is controlled using a design feature and/or a register mark that is present in the first stamping layer.

6. A method according to claim 1, wherein the first stamping layer forms at least one first stamping path on the substrate and the second stamping layer forms at least one second stamping path on the substrate, which is arranged offset relative to the at least one first stamping path transversely to the direction of travel of the substrate.

7. A method according to claim 1, wherein the first and/or second stamping layer and/or a further layer which has been arranged on the substrate in another manner has radiation-curable components which, after being stamped onto or applied to the substrate, are cured by radiation.

8. A method according to claim 1, wherein, after the first stamping, at least one functional element is arranged on the first stamping layer, which element is encapsulated between the first and second stamping layer by the second stamping.

9. A method according to claim 8, wherein the first stamping layer is formed on a first side of the substrate spanning over a window opening penetrating through the substrate, the at least one functional element is arranged in the window opening from a second side of the substrate opposite the first side, and the second stamping layer is formed on the second side of the substrate spanning over the window opening.

10. A hot stamping device for producing a finished stamped substrate end product, the hot stamping device comprising:
a substrate feeder, through which a band-shaped substrate to be stamped can be fed;
a first printing mechanism for printing a first printing layer onto a first surface of the band-shaped substrate;
at least one band guide, through which at least one band-shaped stamping foil can be brought together with the fed substrate;
a first stamping station with a first heated stamping roller and at least two first pressure rollers arranged around the periphery of the first stamping roller at a distance from one another, through which the substrate and one stamping foil resting thereon of the at least one stamping foils can be guided along the periphery of the first stamping roller and thus at least part of the stamping foil resting on the substrate can be stamped onto the first surface of the substrate in the form of a first stamping layer;
a stamp disposed downstream of the first stamping station for forming a window opening through both the first stamping layer and the substrate;
a second stamping station arranged after the first stamping station in relation to the direction of travel of the substrate, with a second heated stamping roller and at least two second pressure rollers arranged around the periphery of the second stamping roller at a distance from one another, through which the once-stamped substrate and one stamping foil resting thereon of the at least one stamping foils can be guided along the periphery of the second stamping roller and thus at least part of the stamping foil resting on the substrate can be stamped onto a second surface, opposite said first surface, of the substrate in the form of a second stamping layer over the window opening;
a turning station disposed between the first and second stamping stations for turning the substrate such that said first and second surfaces are inverted with respect to the direction of travel of the substrate;
a second printing mechanism disposed downstream of the turning station for printing a second printing layer onto the second surface of the band-shaped substrate;
a device for printing a register mark on, or for forming a control opening in, the substrate, the device being disposed before the first stamping and/or between the first and second stamping;
a controller for positioning the first stamping layer and/or the second stamping layer along the direction of travel of the substrate using the register mark or the control opening; and
a substrate delivery unit, through which the twice-stamped substrate can be removed from the device to produce a finished stamped substrate end product.

11. A device according to claim 10, further comprising a third printing mechanism arranged between the first and second stamping station in relation to the direction of travel of the substrate, for applying a third printing layer to the substrate.

12. A device according to claim 10, further comprising a sensor for detecting the register mark printed on, or the control opening formed in the substrate.

13. A device according to claim 10, further comprising a positioning unit for the alignment and/or correction of a position of the substrate and/or the at least one stamping foil.

14. A device according to claim 10, further comprising a radiation unit for radiation of the substrate.

15. A device according to claim 10, further comprising a placement unit for placing at least one functional element on the substrate.

16. A method according to claim 1, wherein a register mark is printed on the substrate and a location of the printed register mark is detected with an optical sensor for controlling the position of the first stamping layer and/or the second stamping layer along the direction of travel of the substrate, said optical sensor being disposed after the first stamping roller, but before the second stamping roller.

17. A device according to claim 12, wherein the sensor is an optical sensor for optically detecting a register mark printed on the substrate, said optical sensor being disposed after the first stamping roller, but before the second stamping roller.

18. A method according to claim 1, wherein the position of the window opening is detected with an optical sensor for controlling the location of the second stamping layer.

* * * * *